(12) United States Patent
Drangmeister et al.

(10) Patent No.: US 11,973,418 B2
(45) Date of Patent: Apr. 30, 2024

(54) INVERTER TO BE CONNECTED TO OR DISCONNECTED FROM A GRID

(71) Applicant: KACO new energy GmbH, Neckarsulm (DE)

(72) Inventors: Harald Drangmeister, Heilbronn (DE); Sven Meissinger, Sinsheim (DE); Christoph Kipphan, Seckach (DE); Jochen Rothweiler, Karlsruhe (DE)

(73) Assignee: KACO new energy GmbH, Neckarsulm (DE)

( * ) Notice: Subject to any disclaimer, the term of this patent is extended or adjusted under 35 U.S.C. 154(b) by 387 days.

(21) Appl. No.: 17/293,128

(22) PCT Filed: Oct. 29, 2019

(86) PCT No.: PCT/EP2019/079467
§ 371 (c)(1),
(2) Date: May 12, 2021

(87) PCT Pub. No.: WO2020/099116
PCT Pub. Date: May 22, 2020

(65) Prior Publication Data
US 2022/0014089 A1    Jan. 13, 2022

(30) Foreign Application Priority Data

Nov. 12, 2018 (DE) .......................... 102018219293.6

(51) Int. Cl.
*H02M 1/32* (2007.01)
*G01K 1/14* (2021.01)
(Continued)

(52) U.S. Cl.
CPC .............. *H02M 1/327* (2021.05); *G01K 1/14* (2013.01); *G01K 7/22* (2013.01); *H02J 3/381* (2013.01); *H02M 7/44* (2013.01); *H02J 2300/24* (2020.01)

(58) Field of Classification Search
CPC .......... H02M 1/327; H02M 7/44; G01K 1/14; G01K 7/22; H02J 3/381; H02J 2300/24
(Continued)

(56) References Cited

U.S. PATENT DOCUMENTS 5,361,184 A      11/1994    El-Sharkawi et al.
9,401,661 B2 *    7/2016    Coors ........................ H02J 3/40
(Continued)

FOREIGN PATENT DOCUMENTS

DE       102011055220 A1    5/2013
EP            3197036 A1    7/2017
WO     WO 2015059195 A1    4/2015

OTHER PUBLICATIONS

Wikipedia: "Relais" [Relay] version Nov. 6, 2018, https://de.wikipedia.org/w/index.php?title=Relais&oldid=182512581.

*Primary Examiner* — Yemane Mehari
(74) *Attorney, Agent, or Firm* — Laurence A. Greenberg; Werner H. Stemer; Ralph E. Locher

(57) ABSTRACT

An inverter includes at least one relay disposed in an interior of the inverter. The relay is configured to connect the inverter to a grid phase or to disconnect the inverter from the grid phase. A temperature sensor is configured to measure an interior temperature of the inverter. A control unit is configured to actuate the relay, to determine the interior temperature by using the temperature sensor, and to calculate a switching time for the relay in dependence on the interior temperature.

5 Claims, 1 Drawing Sheet

(51) Int. Cl.
 *G01K 7/22* (2006.01)
 *H02J 3/38* (2006.01)
 *H02M 7/44* (2006.01)

(58) Field of Classification Search
 USPC .......................................................... 363/95
 See application file for complete search history.

(56) References Cited

U.S. PATENT DOCUMENTS

| | | | |
|---|---|---|---|
| 2011/0084555 A1* | 4/2011 | Pan .................. | H02J 3/381 |
| | | | 307/75 |
| 2013/0026968 A1 | 1/2013 | Tagome et al. | |
| 2013/0057989 A1* | 3/2013 | Victor ................ | H02J 3/46 |
| | | | 361/62 |

* cited by examiner

INVERTER TO BE CONNECTED TO OR DISCONNECTED FROM A GRID

BACKGROUND OF THE INVENTION

Field of the Invention

The invention relates to an inverter.

SUMMARY OF THE INVENTION

The invention is based on the object of providing an inverter that enables reliable connection or disconnection of the inverter to/from an AC voltage grid or three-phase grid.

The invention achieves this object by means of an inverter according to the invention, as described below.

The inverter conventionally has at least one (phase) relay that is arranged in an interior of the inverter, which interior is formed by a housing. The (phase) relay is provided to connect the inverter to an associated grid phase of a three-phase grid or to disconnect the inverter from this grid phase. In this respect, reference is also made to the relevant technical literature.

The inverter also has a temperature sensor, for example in the form of a PTC or NTC thermistor component. The temperature sensor is provided to measure an interior temperature of the inverter, for example by assuming a resistance value that is characteristic of the interior temperature.

The inverter also has a control unit, for example in the form of a signal processor, that is provided to actuate the relay in order to connect the inverter to the grid phase or disconnect the inverter from the grid phase.

The control unit determines the interior temperature by means of the temperature sensor, for example by evaluating the resistance value of the temperature sensor, and calculates a switching time for the relay depending on the interior temperature. Depending on the determined interior temperature, the control unit can also control or regulate yet further functions of the inverter, for example it can reduce a power fed into the three-phase grid by means of the inverter in the case of an excessively high interior temperature, etc.

According to one embodiment, the control unit is designed to calculate the switching time for the relay depending on the interior temperature by the control unit first ascertaining a theoretical switching time. The theoretical switching time is that time at which the relay contact would/should be closed or the relay contact would/should be opened in the case of ideally delay-free switching of the relay, for example because the inverter should be connected to the three-phase grid or should be disconnected from the three-phase grid at the theoretical switching time. The control unit now determines a temperature-dependent hold-back time depending on the interior temperature. The control unit then determines the actual switching time on the basis of the theoretical switching time advanced by the hold-back time, i.e. actuates the relay in a manner advanced by the hold-back time.

According to one embodiment, the inverter has a non-volatile memory, wherein at least one assignment table is stored in the non-volatile memory and in each case assigns an associated, temperature-dependent hold-back time to a plurality of different temperatures.

According to one embodiment, the table covers a temperature range between −40 degrees Celsius and +85 Celsius, for example in steps of 5 K.

According to one embodiment, a number k of assignment tables for k different types of relays are stored in the memory, wherein a respective assignment table of the number k of assignment tables assigns temperature-dependent hold-back times to a number n of different temperatures in a manner that is specific to the type of relay. k=2, 3, 4, etc. and n=2, 3, 4, etc.

According to one embodiment, the inverter has three relays of the same type that are actuated with a temperature-dependent hold-back time in the manner described above.

According to the invention, the (phase) relays of the inverter are switched with a temperature-dependent hold-back time. Proceeding from the desired switching time that has been theoretically calculated in advance in software, the actual switching operation is initiated by the switching command being given in a manner advanced by the temperature-dependent hold-back time. The typical hold-back time is substantially determined by the mechanical inertia of the switching contacts of the relays (=switching delay).

The invention is based on the knowledge that the typical switching delay is not constant over the temperature. Typical values of the switching delay of the relay can be respectively determined for specific temperatures (interpolation points) by gauging the switching behavior of the type of relay used over the intended temperature range. These typical values can also be used to determine the typical switching delay times for further intermediate values of the ambient temperature by means of interpolation. The interpolation parameters obtained therefrom can be stored in the device software. This makes it possible to determine the required hold-back time for switching the (phase) relays for any desired ambient temperature if the current device temperature is known (interior temperature sensor present in the device).

The invention is described in detail below with reference to the drawings.

DETAILED DESCRIPTION OF THE INVENTION

Figure 1:
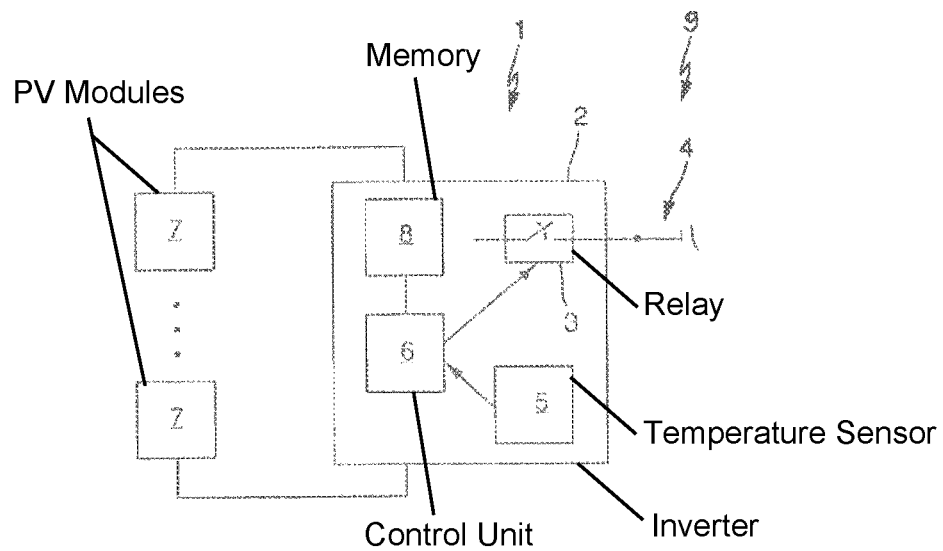
FIG. 1 shows, in a highly schematic manner, a PV system having an inverter according to the invention.

FIG. 1 shows, in a highly schematic manner, a PV system having a number of conventional PV modules 7 and an inverter 1 according to the invention that is coupled thereto. The inverter 1 is conventionally provided to feed electrical energy that has been converted by the PV modules into a three-phase grid 9. A single grid phase 4 of the three-phase grid 9 is shown by way of example.

The inverter 1 has multiple (phase) relays 3 arranged in an interior 2 of the inverter 1, wherein only a single relay 3 is illustrated for reasons of simpler illustration. The relay or relays 3 serve(s) to connect the inverter 1 to an associated grid phase 4 or to disconnect the inverter 1 from this grid phase 4. Also for reasons of simpler illustration, only a single grid phase 4 is illustrated. It goes without saying that three grid phases and associated phase relays are present in the case of a conventional three-phase grid 9.

The inverter 1 has a temperature sensor 5 that is designed to measure an interior temperature of the inverter 1.

The inverter 1 also has a control unit 6, for example in the form of a digital signal processor, that is designed to actuate the relay or relays 3, to determine the interior temperature by means of the temperature sensor 5, and to calculate a switching time for the relay or relays 3 depending on the interior temperature.

Figure 2:
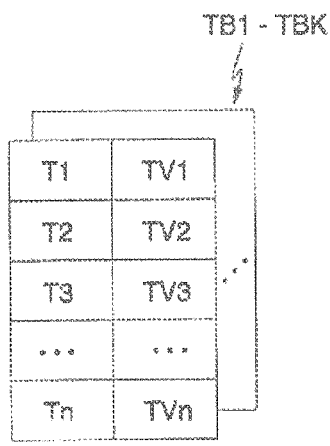
FIG. 2 shows a number of assignment tables that are stored in a memory of the inverter and assign a hold-back time to a temperature.

The control unit 6 is designed to calculate the switching time for the relay or relays 3 depending on the interior temperature by the control unit 6 first ascertaining a theoretical switching time, then determining a hold-back time TV depending on the interior temperature, see FIG. 2, and finally specifying, and accordingly triggering, the actual switching time on the basis of the theoretical switching time advanced by the hold-back time TV.

The inverter 1 has a memory 8, wherein with reference to FIG. 2 a number k of assignment tables TB1 to TBk are stored in the memory 8 and in each case assign a corresponding hold-back time TV1 to TVn to a number n of different temperatures T1 to Tn for k different types of relay 3.

The tables TB1 to TBk in each case cover a temperature range between −40 degrees Celsius and +85 Celsius in 5 K steps.

In the table TB1, a first table entry can assign a hold-back time TV1 of 25 ms to a temperature T1 of −40 degrees Celsius, for example. The next entry then assigns a hold-back time TV1 of 23 ms to a temperature T2 of −35 degrees Celsius, etc. This assignment is carried out for every type i of relay in the assignment table TBi that is specific to the type of relay.

The invention claimed is:

1. An inverter, comprising:
   an interior of the inverter;
   at least one relay disposed in said interior of the inverter, said at least one relay configured to connect the inverter to a grid phase or to disconnect the inverter from the grid phase;
   a temperature sensor configured to measure an interior temperature of the inverter; and
   a control unit configured:
      to actuate said at least one relay,
      to determine the interior temperature by using said temperature sensor, and
      to calculate a switching time for said at least one relay in dependence on the interior temperature by:
         using said control unit to ascertain a theoretical switching time,
         using said control unit to determine a hold-back time depending on the interior temperature, and
         using said control unit to determine the switching time based on the theoretical switching time advanced by the hold-back time.

2. The inverter according to claim 1, which further comprises a memory storing at least one assignment table, said at least one assignment table assigning hold-back times to a number of temperatures.

3. The inverter according to claim 2, wherein said at least one assignment table covers a temperature range between −40 degrees Celsius and +85 Celsius.

4. An inverter, comprising:
   an interior of the inverter;
   at least one relay disposed in said interior of the inverter, said at least one relay configured to connect the inverter to a grid phase or to disconnect the inverter from the grid phase;
   a temperature sensor configured to measure an interior temperature of the inverter;
   a control unit configured:
      to actuate said at least one relay,
      to determine the interior temperature by using said temperature sensor, and
      to calculate a switching time for said at least one relay in dependence on the interior temperature; and
   a memory storing at least one assignment table, said at least one assignment table assigning hold-back times to a number of temperatures, said memory storing a number k of assignment tables for k different types of relays, and a respective assignment table of the number k of assignment tables assigning hold-back times to a number n of temperatures in a manner specific to a type of relay.

5. The inverter according to claim 1, wherein said at least one relay is three relays.

* * * * *